US012382117B2

(12) United States Patent
Uijtdehaag et al.

(10) Patent No.: US 12,382,117 B2
(45) Date of Patent: Aug. 5, 2025

(54) SYSTEM AND METHOD FOR DYNAMIC BITRATE SWITCHING OF MEDIA STREAMS IN A MEDIA BROADCAST PRODUCTION

(71) Applicant: Grass Valley Canada, Montreal (CA)

(72) Inventors: Joost August Adriaan Felix Emanuel Uijtdehaag, Breda (NL); Paulus Wilhelmus Marinus Gijsbertus De Bresser, Breda (NL)

(73) Assignee: GRASS VALLEY CANADA, Montreal (CA)

( * ) Notice: Subject to any disclaimer, the term of this patent is extended or adjusted under 35 U.S.C. 154(b) by 77 days.

(21) Appl. No.: 17/654,504

(22) Filed: Mar. 11, 2022

(65) Prior Publication Data

US 2022/0303596 A1    Sep. 22, 2022

Related U.S. Application Data

(60) Provisional application No. 63/162,981, filed on Mar. 18, 2021.

(51) Int. Cl.
*H04N 21/2385* (2011.01)
*H04N 21/2187* (2011.01)

(52) U.S. Cl.
CPC ..... *H04N 21/2385* (2013.01); *H04N 21/2187* (2013.01)

(58) Field of Classification Search
CPC ........................ H04N 21/2385; H04N 21/2187
USPC .................................................. 725/116, 131
See application file for complete search history.

(56) References Cited

U.S. PATENT DOCUMENTS

| | | | | |
|---|---|---|---|---|
| 7,839,926 B1 * | 11/2010 | Metzger | ................. | H04N 7/181 |
| | | | | 375/240.26 |
| 9,788,017 B2 * | 10/2017 | Laganiere | ............ | H04N 21/632 |
| 10,009,443 B1 * | 6/2018 | Guigli | .................... | H04L 41/122 |
| 2001/0017671 A1 * | 8/2001 | Pleven | .................... | H04N 5/272 |
| | | | | 348/518 |
| 2015/0281752 A1 * | 10/2015 | Van Veldhuisen | ... | H04N 21/233 |
| | | | | 725/116 |
| 2016/0227546 A1 | 8/2016 | Freeman et al. | | |
| 2016/0314819 A1 * | 10/2016 | Elsner | .................... | H04N 19/46 |
| 2018/0212768 A1 * | 7/2018 | Kawashima | ........ | H04L 63/0876 |

(Continued)

OTHER PUBLICATIONS

International Search Report mailed on Jun. 10, 2022, from PCT/CA2022/050405, International filing date Mar. 17, 2022. 9 pages.

*Primary Examiner* — Alfonso Castro
(74) *Attorney, Agent, or Firm* — ARENTFOX SCHIFF LLP

(57) ABSTRACT

A system and method is provided for reducing the bandwidth for media broadcast production. The system includes a plurality of content providing devices and a remote production system. Each of the content providing devices has a corresponding variable encoder. The remote production system transmits control signals to the variable encoders, controlling them to use a high-fidelity encoding method or a compressed encoding method. The remote production system controls the variable encoders such that a media feed being included in a media production is encoded using the high-fidelity encoding method, and some or all of the other media streams are encoded using the compressed encoding method.

17 Claims, 10 Drawing Sheets

(56) References Cited

U.S. PATENT DOCUMENTS

2020/0084482 A1 3/2020 Nielsen
2020/0112726 A1 4/2020 Lie et al.

* cited by examiner

SYSTEM AND METHOD FOR DYNAMIC BITRATE SWITCHING OF MEDIA STREAMS IN A MEDIA BROADCAST PRODUCTION

CROSS REFERENCE TO RELATED APPLICATIONS

The current application claims priority to U.S. Patent Provisional Application No. 63/162,981, filed Mar. 18, 2021, the entire contents of which are hereby incorporated by reference.

TECHNICAL FIELD

The present disclosure generally relates to video and media production, and, more particularly, to a system and method for media production that dynamically switches bitrate of media streams to reduce bandwidth consumption in a video production environment.

BACKGROUND

Media production, such as live television broadcasting, typically involves capturing media content from a live scene (e.g., a sports venue, news broadcast, etc.), transmitting the captured content to a production facility where the video and audio signals are managed by production switchers, and then encoding the signals for transport to a distribution network. Multiple devices at the live scene may generate multiple media streams, such as multiple cameras capturing different angles of the live scene, and the media streams are transmitted to the production facility. At the production facility, a production system may select which media stream will be included in the live media production at any given time (for example, as indicated by a user such as the director of the live media production), and may generate and encode the live media production at that time from that media stream.

The production facility may be remote from the live scene being captured. Each of the media streams from the multiple devices are transmitted to the remote production facility over a communication link. Where a significant number of devices are creating media streams and/or where the media streams are high quality, the bandwidth requirements for the communication link may be significant.

Typically, in a workflow for a live remote production where multiple cameras are located (e.g., 20 cameras) on the venue and where the production facilities like video switching and shading are done on a central location, all camera feeds are compressed and sent over a communication link. In many cases this is a fiber connection with a certain capacity that is limited by availability, technology and cost. Moreover, to meet the video quality standards for the production, the video signals of all cameras must be transmitted in the highest quality (e.g., visual lossless compression) from the event location to the central production facility. All video sources of all cameras must also be available simultaneously to allow camera vision engineers to adjust the picture remotely and to generate a multi-view for the technical director and video switch operator to make production decisions in real-time.

In practice, the bandwidth that is required for the remote production link is proportional to the number of feeds/cameras (e.g., UHD is >11G per camera @ 59.94 Hz) and can be a huge cost and technical challenge depending on the distance and available infrastructure. Accordingly, a system and method is needed that reduces total bandwidth consumption to account for physical and economic constrains while also still providing media content at a quality that is acceptable for the media production.

SUMMARY

Therefore, a system and method is disclosed herein that provides for broadcast media production with reduced bandwidth. More particularly, the system and method disclosed herein reduces and dynamically manages the bandwidth used between the content providing devices and the production facility to reduce the cost and/or technical requirements of the link between the content providing devices and the production facility. To do so, the system and method dynamically chooses between compression of the media streams while also ensuring that the "LIVE-ON-AIR" is of the highest quality (i.e., visual lossless compressed).

In a particular embodiment, a system and method is provided for reducing the bandwidth for broadcast media production. The system includes a plurality of content providing devices and a remote production system. Each of the content providing devices has a corresponding variable encoder. The remote production system transmits control signals to the variable encoders, controlling them to use a high-quality encoding method or a compressed encoding method. The remote production system controls the variable encoders such that a media feed that is included in a remote media production is encoded using the high-quality encoding method, and some or all of the other media streams are encoded using the compressed encoding method.

In one exemplary aspect, the remote production system receives media content streams from a plurality of broadcast cameras at a live event (e.g., a sporting event). Moreover, only the camera that is "LIVE-ON-AIR" (and possibly a second camera receiving a tally signal) during a production will transmit its signal in high quality (e.g., visual lossless compressed) and the remaining cameras will transmit the signal in a significant lower quality and at a lower bitrate, for example, using 1:20 compression ratio. As a result, if the system implements many cameras (e.g., 20 or more cameras), the total bandwidth reduction is significant and saves costs on the communication link between the venue location and remote control center. In this system, the control center confirms which of the cameras (or other source of the compressed stream) knows that it is on-air, for example, using the existing camera tally control or a new separate control signal. In addition, the system and method is configured to adjust on-the-fly and dynamically the bitrate of the compression within a very short time (e.g., 1 frame) without causing visible artifacts on the image or causing problems for the encoder and decoder bitrate control and buffering. To do so, a compression method is used that is both sub-frame latency and has a predictive bitrate control without feedback loop, such as JPEG XS and JPEG 2000. These configurations enable frame accurate switching between which signals are being compressed at the high-quality encoding and which signals are compressed at a low-quality to reduce total bandwidth and also create a predictive consumption of bandwidth for the link between the remote scene (e.g., live event) and the media production control center.

Moreover, in an exemplary aspect, the video compression is configurable in the camera for the maximum bitrate (e.g., minimum compression ratio) for the case where the camera is on-air (i.e., as the selected as main feed), and also for the case where the camera is not selected, but only used for preview at the central production location. These can be two bitrate numbers or a certain ratio between the high and low bitrate. Yet further, multiple camera feeds can be selected in high bitrate, for example, to make a video transmission (e.g., the preview signal). This configuration can also be implemented by the tally indications that are logically programmable in a video switcher.

It is noted that because the delay in sending the tally indication and the actual change of bitrate might be up to a frame (i.e., instantaneous on a per frame basis), this might not be in time for the moment of switching video sources in the video switcher. To address this configuration limitation in an exemplary aspect, a frame delay can be added before the video source is selected, while sending the tally indication without delay.

In another exemplary aspect, a system is provided for dynamic bitrate switching of media streams in a media video production. In this aspect, the system includes a plurality of content providing devices that each have a variable encoder configured to encode a media stream at a media production quality and at a non-media production quality that is lower than the media production quality; and a production system located remotely from the plurality of content providing devices and configured to transmit respective control signals to at least one content providing device of the plurality of content providing devices to control an encoding process by the variable encoder of the at least one content providing device. Moreover, the production system includes a control system for transmitting the respective control signals to dynamically adjust respective bitrates of each media stream transmitted by the plurality of content providing devices to maintain a total bandwidth consumption of a data transmission link between the plurality of content providing devices and the production system below a predefined bandwidth consumption threshold. Yet further, the at least one content providing device is a media production camera and the respective control signal sent to the at least one content providing device is a tally signal indicating the media stream of the at least one content providing device is currently being distributed in a live media production by the production system, such that the variable encoder of the at least one content providing device encodes the media stream in the media production quality, and the production system is configured to generate the live media production based on the media stream received from the at least one content providing device.

In another exemplary aspect, the control system is further configured to transmit the respective control signals to each variable encoder of the plurality of content providing devices to dynamically adjust the respective bitrates of each media stream to maintain the total bandwidth consumption of the data transmission link below the predefined bandwidth consumption threshold.

In another exemplary aspect, the control system is further configured to reset each variable encoder of the plurality of content providing devices at a top of each frame of each media stream to dynamically adjust the respective bitrates of each media stream instantaneously.

In another exemplary aspect, the respective control signal sent to the at least one content providing device configures the at least one content providing device to encode the respective media stream at a visually lossless compression.

In another exemplary aspect, the plurality of content providing devices are located at a venue for providing each media stream of live video content for a live media production.

In another exemplary aspect, each variable encoder of the plurality of content providing devices are configured to encode the respective media stream at a plurality of compression rates including compression rates for the media production quality and the non-media production quality.

In yet another exemplary aspect, a system is provided for dynamic bitrate switching of media streams in a media video production. In this aspect, the system includes a plurality of content providing devices that each have a variable encoder configured to encode a media stream at a media production quality and at a non-media production quality that is lower than the media production quality; and a production system located remotely from the plurality of content providing devices and configured to transmit respective control signals to at least one content providing device of the plurality of content providing devices to control an encoding process by the variable encoder of the at least one content providing device. Moreover, the exemplary the production system includes a control system for transmitting the respective control signals to dynamically adjust respective bitrates of each media stream transmitted by the plurality of content providing devices to maintain a total bandwidth consumption of a data transmission link between the plurality of content providing devices and the production system below a predefined bandwidth consumption threshold.

In yet another exemplary aspect, a system is provided for dynamic bitrate switching of media streams in a media video production. In this aspect, the system includes at least one content providing device having a variable encoder configured to encode a media stream at a media production quality and at a non-media production quality that is lower than the media production quality; and a production system located remotely from the at least one content providing device and configured to transmit a control signal to the at least one content providing device to control an encoding process by the variable encoder. Moreover, the production system includes a control system for transmitting the control signal to dynamically adjust a bitrate of the media stream transmitted by the at least one content providing device to maintain a total bandwidth consumption of a data transmission link between the at least content providing device and the production system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
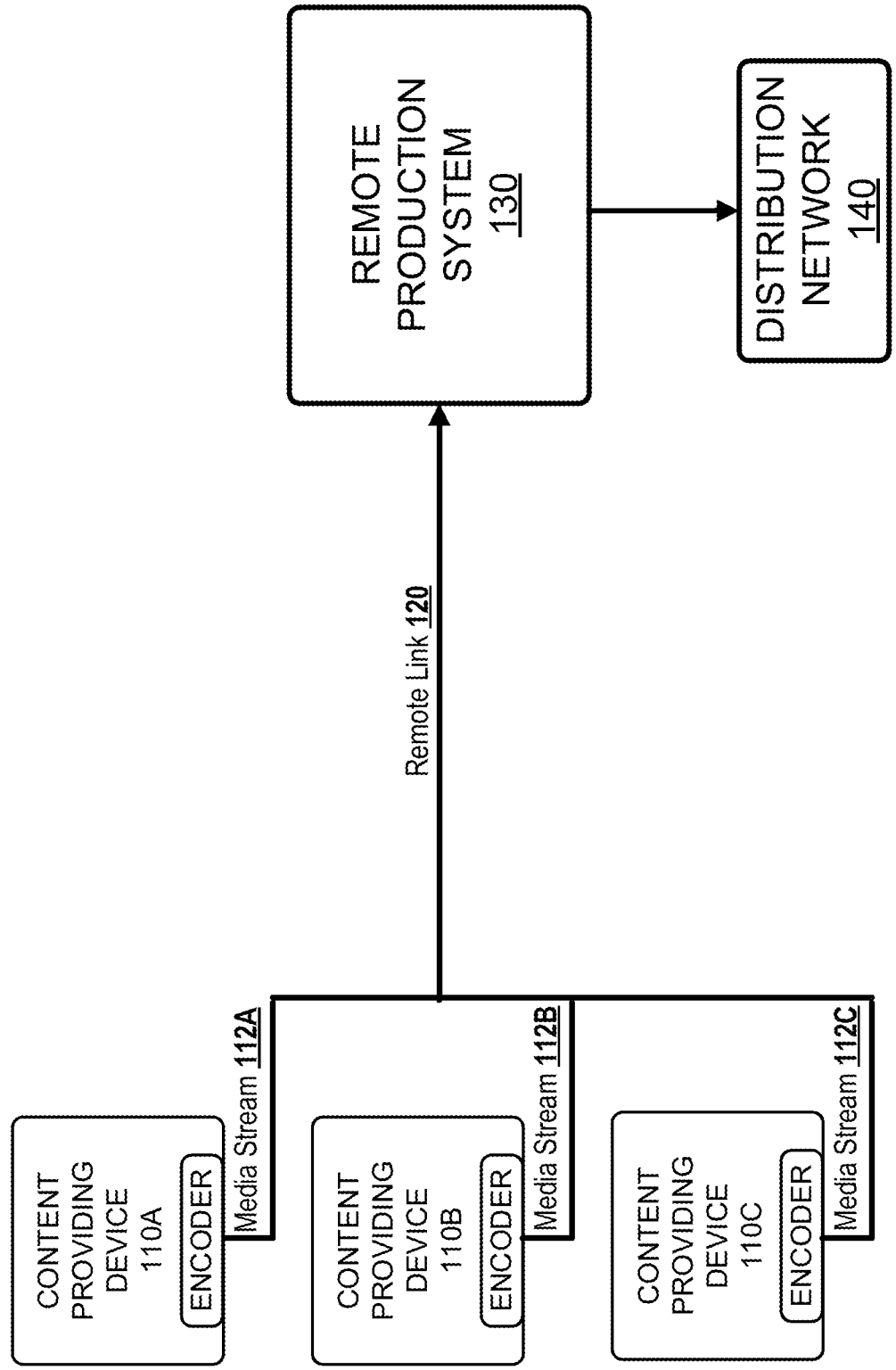
FIG. 1 is a block diagram of a system for producing a media production according to an exemplary aspect.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions and algorithms described herein may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

FIG. 1 is a block diagram 100 of a system for producing a media production, such as a broadcast media production. The system includes content providing devices 110A, 110B, and 110C, and a remote production system 130. In general, the content providing devices 110A, 110B, and 110C can be any type of media generating, storage and/or transport device configured to transmit media content (e.g., a video or audio stream) to the remove production system 130.

In one exemplary aspect, the system 100 can be implemented in a live production environment. For example, the content providing devices 110A-C can be configured to generate and/or transport media content streams which may be included in the media production. For example, the media production may be a live media production, such as a sporting event or a concert, and the content providing devices 110A-C may be different cameras capturing different angles of the live event at a venue. Each of the content providing devices 110A-C may include a variable encoder that can be configured to encode the media captured by the content providing devices 110A-C to generate respective media streams 112A-C.

It is noted that while the exemplary aspect described herein is generally in the context of a live media production, the systems and methods described herein can be implemented in type of media production that requires multiple media streams to be accessed by a remote production center from respective content providing devices. Thus, in an alternative aspect, the content providing devices can be one or more conversion devices that is configured to receive a media stream from a source (e.g., a remote camera at a live event) and compresses the stream using the techniques described herein to be sent to the remote control center.

In the exemplary aspect, the remote production system 130 may be remote from the content providing devices 110A-C. For example, where the content providing devices 110A-C are content generating devices, such as cameras and/or microphones, at a sporting event, the remote production system 130 may be at a television studio. The media streams 112A-C are transmitted to the remote production system 130 over a remote link 120 (e.g., a data transmission link).

The remote production system 130 generates the media production based on the received media streams. The media production may be a separate media stream, and may be transmitted to a distribution network 140 to allow viewing of the live event or other media presentation. The remote production system 130 may include the media content generated by one of the content providing devices (e.g., one camera angle) or a subset of the content providing devices in the media production at a given time, and may switch which content generating device's media content is displayed throughout the media production. The remote production system 130 may include a multi-view interface (i.e., a multiviewer panel) configured to display the received media streams generated by the content providing devices, and may be configured to receive a user input to select which of the received media streams is included at that time as part of a production switching environment. That is, a technical director at the remote production system 130 can use the user interface of the multiviewer for purposes of selecting which signals are to be provided for "live" or "on air" for purposes of a media broadcast.

As the media streams 114A-C may be included in the media production, the variable encoders at the content providing devices 210A-C may encode the media streams 114A-C in a first quality (e.g., high quality for video production) with little or no compression, to meet the video quality standards for the media production. For example, the media streams 114A-C may be encoded with visual lossless compression. Moreover, the remote link 120 may have a limited available bandwidth, or providing a remote link 120 with adequate bandwidth may be expensive or difficult. As will be discussed in more detail below and according to the exemplary aspect, the remote link 120 can have a total predefined bandwidth with the variable encoders each being configured to dynamically adjust the compression of each of the media streams 114A-C to ensure that the total consumed bandwidth by these media streams 114A-C is at or below the predefined bandwidth consumption threshold of remote link 120.

It is also noted that although three exemplary content providing devices are shown in FIG. 1, it should be appreciated that in practice, a media production (e.g., a live broadcast production) may include many more content providing devices. In applications with a large number of content providing devices and/or where the encoded media content streams have a large size, providing a remote link 120 with adequate bandwidth may be a huge cost and technical challenge, depending on the distance and the available infrastructure. While bandwidth requirements may be reduced by compressing the media streams or increasing the degree of compression, doing so may result in a drop in quality of the media when included in the media production. Further, compression may increase latency, complicating the remote production process and delaying the delivery of the media production to viewers.

Figure 2A:
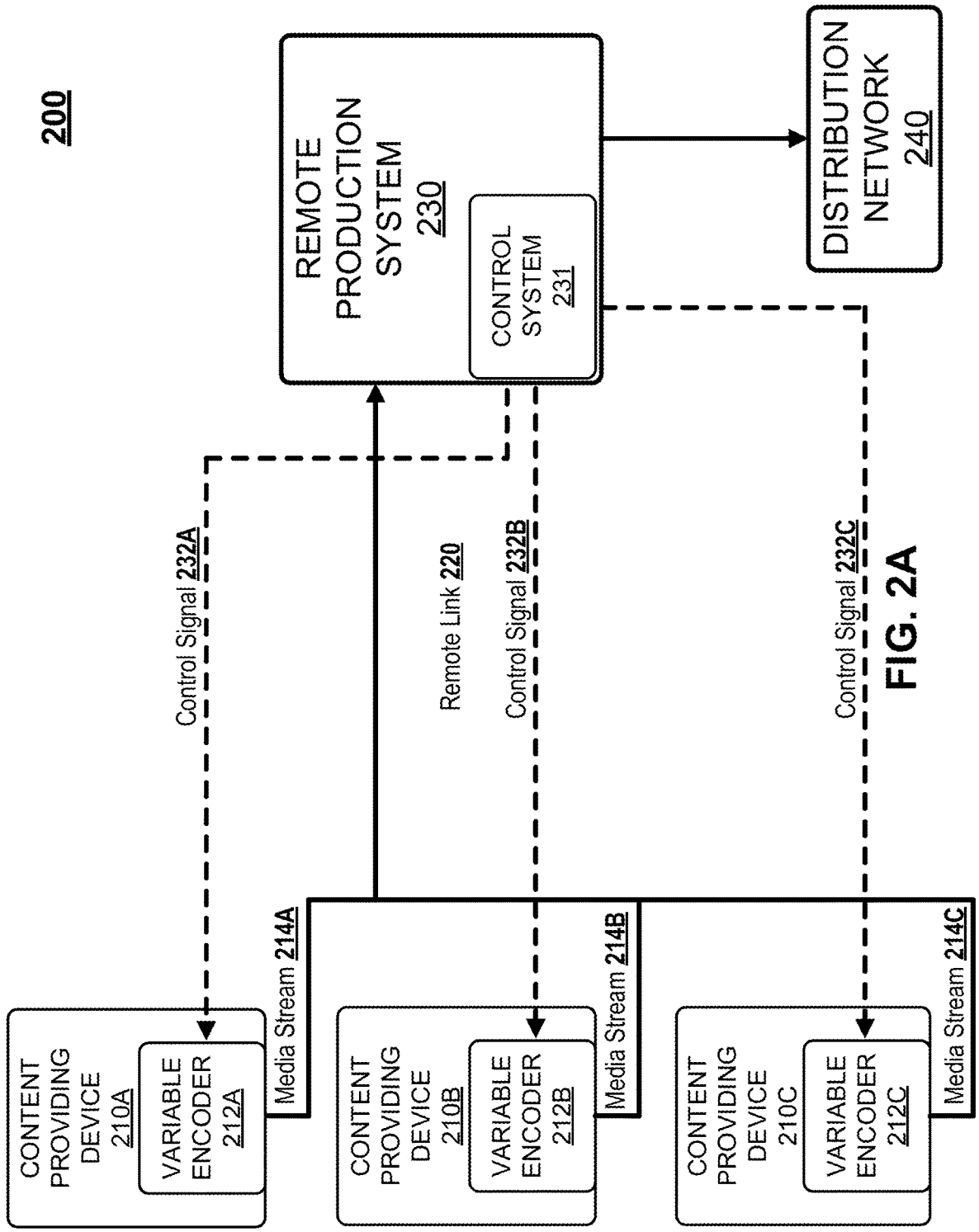
FIG. 2A is a block diagram of a system for producing a media production with reduced bandwidth usage according to an exemplary aspect.

FIG. 2A is a block diagram 200 of a system for producing a media production with reduced bandwidth usage. The system includes content providing devices 210A, 210B, and 210C, a remote link 220, and a remote production system 230. The content providing devices 210A-C generate media content streams which may be included in the media production and transmit the media content streams 214A-214C to the remote production system 230 over the remote link 220. In some aspects, the remote link 220 may be an IP link and the media streams 214A-C may be transmitted according to the SMPTE 2110 standard. In some aspects, the remote link 220 may be a fiber link.

According to an exemplary aspect, the content providing devices 210A-C are media production cameras, for example, where the live media production is showing a live event, and the media content stream generated may be the video and image data captured by the respective cameras. In some aspects, the content providing devices 210A-C may include microphones, and the media content stream may include audio from the microphone. In some aspects, the content providing devices 210A-C may be computers or capture cards in computers, and the media content stream generated may be the display output of the computer. For example, the media production may be of an e-sports event where players compete in digital games, and the media content streams may be the on-screen displays of the players. It is noted that while only three content providing devices are shown, the system can be implemented using any number of content providing devices.

The content providing devices 210A-C may include or may be coupled to respective variable encoders 212A, 212B, and 212C. The variable encoders 212A-C are configured to encode the media captured by the content providing devices 210A-C, thereby generating respective media streams 214A-C. The variable encoders 212A-C may be configured with two or more different encoding methods (e.g., a first encoding quality and a second encoding quality), and can be configured to use one of the configured encoding methods to encode the media captured by the content providing devices 210A-C. Different encoding methods may include using the same compression codec with a different bitrate or different compression ratio. One encoding method may include compressing the media content to generate the media stream, and may be referred to as a compressed encoding method. For example, the compressed encoding method may include compressing the media content with a 20:1 compression ratio (e.g., if there are 20 content providing devices). Another encoding method may be a high-fidelity encoding method (e.g., a media production quality). The high-fidelity encoding method may not include compressing the media content, or may include a lesser degree of compression than the compressed encoding method. For example, the high-fidelity encoding method may include compressing the media content with a 4:1 compression ratio. Compression used in the high-fidelity encoding method may be visual lossless compression. In some aspects, the variable encoders 212A-C may be variable bitrate encoders using a particular compression codec, the compressed encoding method may be encoding at a lower bitrate, and the high-fidelity encoding method may be encoding at a higher bitrate. In some aspects, the compressed encoding method may have a set bitrate and the high-fidelity encoding method may have a set bitrate that is higher than the bitrate of the compressed encoding method. In some other aspects, the bitrate of the compressed encoding method may be defined as a ratio of the bitrate of the high-fidelity encoding method.

The variable encoders 212A-C may be configured to switch dynamically between the different encoding methods in a very short period of time. For example, the variable encoders 212A-C may be configured to frame-accurate switch between the different encoding methods within one frame of the media stream (e.g., sub-frame switching latency). The compression method used may include predictive bitrate control without a feedback loop. In some aspects, the variable encoders 212A-C may be configured to compress the media content based on the JPEG XS codec. In some aspects, the variable encoders 212A-C may be configured to compress the media content based on the JPEG 2000 codec. In general, the variable encoders 212A-C can be any type of encoding device for media content, including, for example, VC-2 (SMPTE 2042), and TICO (SMPTE RDD 35) in alternative aspects.

The remote production system 230 is configured to generate a media production using the media content generated by the content providing devices 210A-C, and may transmit the media production (e.g., a live media broadcast production) to a distribution network 240 for distribution to viewers. The remote production system 230 may include a decoder or decoders. The decoder or decoders are configured to receive the encoded media streams 214A-C and decode them into displayable media. The remote production system 230 may include a multi-viewer interface. In one aspect, the remote production system 230 includes a control system 231 that controls the multi-viewer interface to receive the decoded media streams and display the decoded media streams (e.g., as source inputs) for a user, such as a technical director of the media production. The remote production system 230 may include a video production switcher. The video production switcher may be configured to receive a control input from the user corresponding to one of the media streams 214A-C and to include the identified media stream in the media production. The director of the media production may monitor the various media streams using the multi-viewer and may select the stream that he or she wants to include in the media production at that time using the video production switcher.

The video production system 230 may also be configured to modify a media stream before the media stream is included in the media production broadcast. For example, the production system may adjust aspects of media streams, such as the brightness or contrast, or may add graphics (e.g., logos and other ancillary data) to the media stream. The production system may be configured to receive the decoded media streams and to display the decoded media streams, and may be configured to receive control inputs from a user to determine how a given media stream should be modified.

The control system 231 of the remote production system 230 is configured to transmit respective control signals 232A, 232B, and 232C to the variable encoders 212A-C. For example, the control system 231 can be implemented as a separate control component and/or part of the video production switcher. In either case, the control system 231 can be configured to transmit the control signals 232A-C to the variable encoders 212A-C. The control signal for a variable encoder identifies which encoding method the receiving variable encoder should use to encode its media stream. For example, in one aspect, the control system 231 of the remote production system 230 can be configured to transmit a tally signal for the "on air" or next signal to be "on air" as the control signals for two of the plurality of content providing devices 210A-C. In this regard, the content providing devices 210A-C that receive these tally signals can be configured to encode their respective media streams using the high-fidelity encoding method. Moreover, the control system 231 of the remote production system 230 may be configured to transmit a control signal (e.g., a separate control signal) identifying the high-fidelity encoding method to the variable encoder providing the media stream which the video switcher is including in the media production. The control system 231 of the remote production system 230 can also be configured to transmit a control signal identifying the compressed encoding method to some or all of the variable encoders providing the other media streams. Or alternatively or in addition thereto, the content providing devices 210A-C not receiving the tally signals can be automatically configured to encode their respective media streams using the compressed encoding method. The variable encoders 212A-C may be configured to receive the control signals 232A-C, to encode their respective media streams 214A-C based on the identified encoding method, and to switch encoding methods when the control signal identifies a different encoding method.

When one of the media streams 214A-C is included in the media production by the video switcher (e.g., as controlled by a tally signal), the control system 231 of the remote production system 230 controls (e.g., by the tally signal or a separate control signal) the variable encoder providing that media stream to encode the media stream using the high-fidelity (the first or high-quality) encoding method, so the decoded media stream received at the remote production system 230 maintains a high quality and is suitable and configured for the media production. The control system 231 of the remote production system 230 controls some or all of the remaining variable encoders to encode their media streams using the compressed encoding method, reducing their bandwidth on the remote link 220 and, in some exemplary aspects, dynamically managing the total bandwidth of all streams on the remote link 220 to be at or below a predefined threshold of bandwidth. To do so, the media streams encoded using the compressed encoding method may be low quality when decoded at the remote production system 230, but may still be suitable to be displayed on the multi-viewer and the production system. That is, a multi-viewer may typically have 16 or 32 windows on the screen interface. As a result, each individual source displayed thereon need not be displayed at a high quality if it is not the signal source being used for the video production. Therefore, controlling the respective encoders of the content providing devices 210A-C to control whether to use the first encoding technique (e.g., high or broadcast quality encoding) and the second encoding technique (e.g., low or proxy quality encoding), the system can dynamically manage overall bandwidth consumption over the remote link 220 to signal the media signals back to the remove production system 230.

As a result, when the video switcher changes the media stream being included in the media production, the control system 231 of the remote production system 230 controls the variable encoder of the newly-selected media stream to switch to the high-fidelity encoding method and may control the variable encoder of the previously-selected media stream to switch to the compressed encoding method. Preferably, this switching is don instantaneously on a frame by frame basis. Because the variable encoders 212A-C are configured to switch to the high-fidelity encoding method with sub-frame switching latency, the newly-selected media stream may be high quality when decoded at the remote production system 230 and ready for inclusion in the media production. The bandwidth required for the remote link 220 may therefore be significantly reduced and dynamically managed as compared to a system in which all of the media streams have the same bandwidth, while the media streams included in the media production do not lose quality due to compression. Effectively, the system creates a control system that enables the remote production system 230 to dynamically and continuously adjust which of the variable encoders 212A-C are encoding media content using the first encoding technique and which of the variable encoders 212A-C are encoding media content using the second encoding technique to manage total bandwidth consumption over the link 220, for example, by managing a fixed bitrate of the link 220, while dynamically adjusting the variable bitrates of each individual media stream.

In an exemplary aspect, this is done by presetting the control system for the cameras receiving the red (e.g., "on air") and yellow (e.g., next "on air") signals to be transmitted using the high quality encoding technique. The variable encoders of these two cameras can be controlled to use the high quality encoding technique based on the tally signals, which can be configured as an indication or rigger to use such an encoding technique.

Moreover, in an exemplary aspect, the control system 231 of the remote production system 230 can be configured to check if the control messages are received by the variable encoder 212A-C in order to prevent that more encoders are configured for high quality encoding than is allowed by the bandwidth constraint (of the entire system) as a result of a failing control connection. In other words, the control system 231 is configured to monitor the status of each of the encoders 212A-C (can be more than three encoders) based on control messages. As a result, the control system can dynamically ensure that the encoders are only performing the high quality encoding if the transmitted streams by these encoders will not surpass the total bandwidth constraints defined by the system. Moreover, the control system 231 may also include a fail-safe operation where repeated control messages are required to keep each encoder 212A-C in a high quality mode and falling back to compressed encoding when no control messages are received. Yet further, the control messages of the control system 231 may be sent over the same network connection as the media streams or using a separate link as shown in FIG. 2A, for example.

Figure 2B:
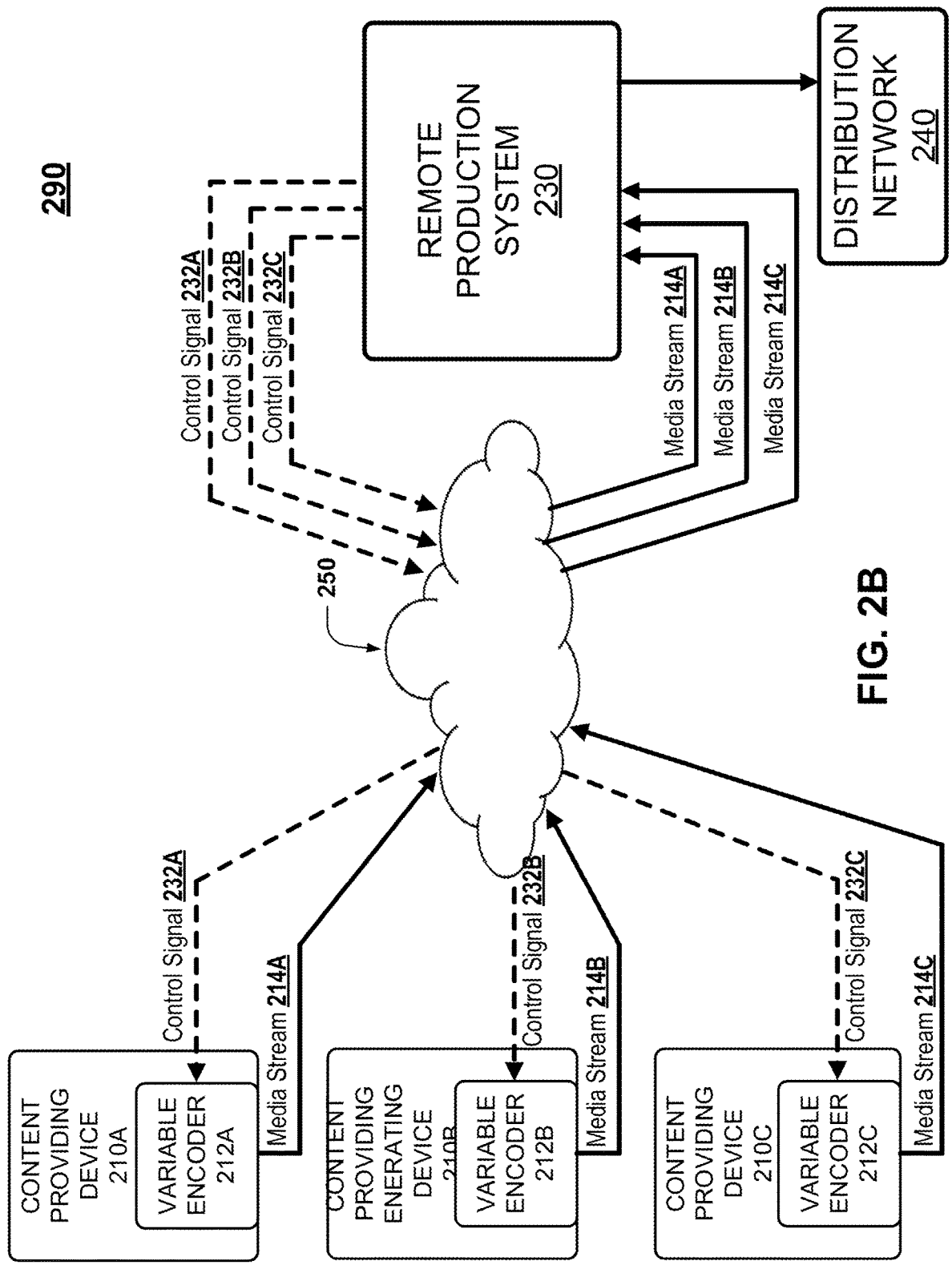
FIG. 2B is a block diagram of a system for producing a media production with reduced bandwidth usage using a network-based link according to an exemplary aspect.
Figure 2C:
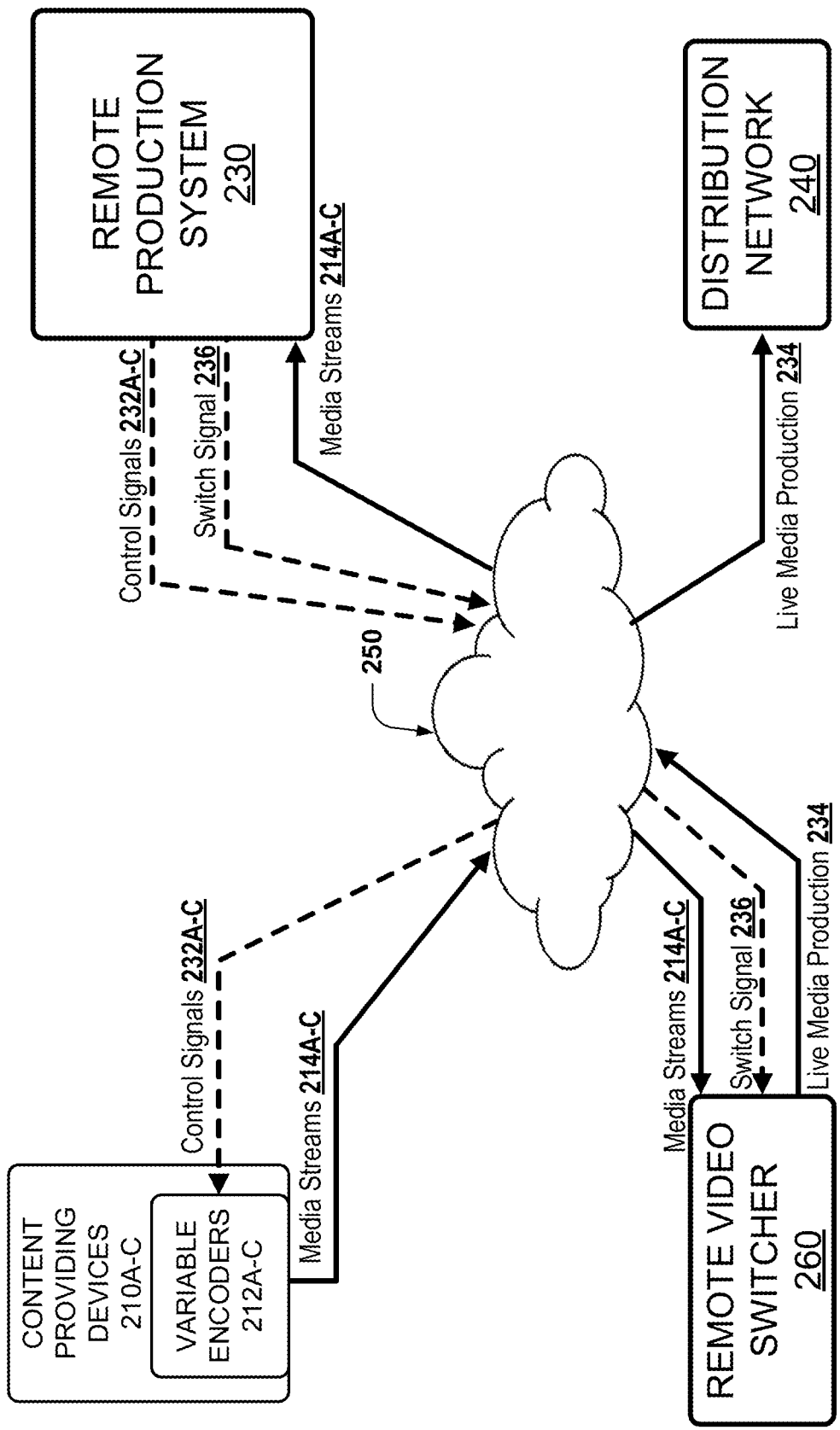
FIG. 2C is a block diagram of a distributed system for producing a media production with reduced bandwidth usage according to an exemplary aspect.

FIGS. 2B and 2C illustrate alternative arrangements of the system shown in FIG. 2A. As shown, each of the systems 290 and 295 can include a remote production system 230 configured similar to that described above with respect to FIG. 2A. Moreover, in an exemplary aspect, these remote production systems 230 can also similarly include a control system 231, although this component is not specifically shown in FIGS. 2B and 2C. However, it should be appreciated that the generating of control signals can be implemented in a similar manner as described above using control system 231, for example.

In an exemplary aspect, the system of FIG. 2A transmits the media streams 214A-C to the remote production system over a remote link 220 between the location of the content providing devices 210A-C and the remote production system 230. As the variable encoding methods used by the system may result in reduced bandwidth for the media streams communicated between the content providing devices 210A-C and the remote production system 230, alternative means of transmitting the media streams to the remote production system 230 may be possible that might not be practical or possible using a conventional system. FIG. 2B is a block diagram 290 of a system for producing a media production (e.g., a live media production) with reduced bandwidth usage using a network-based link. FIG. 2C is a block diagram 295 of a distributed system for producing a media production with reduced bandwidth usage.

As illustrated in FIG. 2B, the content providing devices 210A-C and the remote production system 230 are coupled to a communication network 250, such as the Internet. The communication network 250 may include a network of servers and network devices configured to transmit and receive video and/or audio signals of various formats, for example, using internet protocol (IP). The content providing devices 210A-C are configured to transmit the media streams 214A-C for the remote production system 230 to the communication network 250, and the communication network 250 is configured to forward the media streams 214A-C to the remote production system 230. Similarly, the remote production system 230 is configured to transmit the control signals 232A-C for the content providing devices 210A-C to the communication network 250, and the communication network 250 is configured to forward the control signals 232A-C to their respective variable encoders 212A-C. Through use of the communication network 250, the system may be able to perform remote media production leveraging existing infrastructure, avoiding the need for a dedicated remote link between the content providing devices 210A-C and the remote production system 230.

As illustrated in FIG. 2C, the content providing devices 210A-C, the remote production system 230, the distribution network 240, and a remote video switcher 260 may be coupled to a communication network 250, such as the Internet. Some or all of the content providing devices 210A-C, the remote production system 230, the distribution network 240, and the remote video switcher 260 may be located at disparate geographic locations.

The remote production system 230 of FIG. 2C utilizes the remote video switcher 260 to generate the media production. The content providing devices 210A-C are configured to transmit the media streams 214A-C for the remote production system 230 and for the remote video switcher 260 to the communication network 250, and the communication network 250 is configured to forward the media streams 214A-C to the remote production system 230 and the remote video switcher 260. The remote production system 230 is configured to decode and display the media streams 214A-C for a user. The remote video switcher 260 is configured to generate a media production 234, and to decode the media streams 214A-C and include one of the decoded media streams in the media production 234. The remote production system 230 is configured to generate a switch signal 236 to identify one of the media streams 214A-C to be included in the media production 234, and may be configured to change the switch signal 236 to identify a different media stream when a user of the remote production system 230 selects a different media stream. The remote production system 230 is configured to transmit the switch signal 236 to the communication network 250, and the communication network 250 is configured to forward the switch signal 236 to the remote video switcher 260. The remote video switcher 260 is configured to include the media stream identified by the switch signal 236 in the media production 234. The remote video switcher 260 is further configured to transmit the generated media production 234 to the communication network 250, and the communication network 250 is configured to forward the media production 234 to the distribution network 240. Alternatively, in some aspects, the communication network 250 may serve as the distribution network and may forward the media production to end user devices for viewing.

Yet further, the remote production system 230 can be configured as a software based environment that can be provided in a cloud-computing environment, remote production center, production truck or the like, as would be appreciated to one skilled in the art. More particularly, the remote production system 230 can be configured as a virtual router panel and production system in a cloud computing environment. It is also noted that the exemplary embodiment is described in the context of media production and, in an exemplary aspect, live or real-time media production and broadcast. In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client microservices, storage, and backup. A management software layer for the application platform offered by the cloud will typically be provided on a hardware node and will include a virtual environment manager component that starts the virtual environments for the platform and can include microservices and containers, for example. Thus, according to an exemplary aspect, one or more of the components (or work packages) of system 200 that can be implemented in the cloud platform as described herein.

Figure 3:
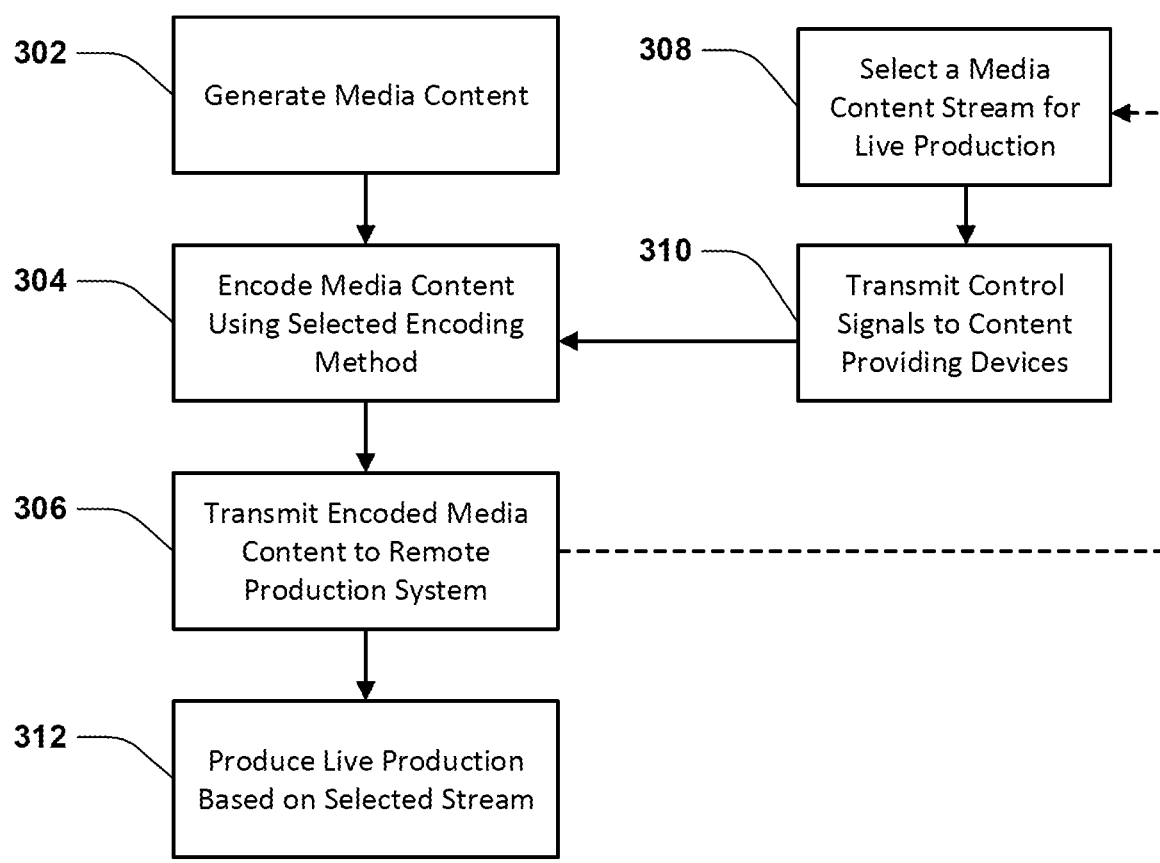
FIG. 3 is a flowchart illustrating a method of producing a media production with reduced bandwidth usage according to an exemplary aspect.

FIG. 3 is a flowchart 300 illustrating a method of producing a live media production with reduced bandwidth usage. In general, it should be appreciated that the method may be performed using one or more of the exemplary systems described above with respect to FIGS. 2A, 2B, and 2C. Moreover, the methods described below are described in an exemplary aspect for live media production. However, as also noted above, it is reiterated that the systems and method can be implemented in any context for media production where remote media feeds/streams are being transmitted to a control certain from a plurality of locations. Thus, the disclosed systems and methods can be implemented outside the context of a live media production and can be implemented for any type of media production as would be understood to one skilled in the art.

At 302, the system may generate media content. For example, this may include a camera capturing a video feed as image data at a live venue, for example, or a capture card capturing a display output. This may be performed by a content providing device, such as content providing devices 210A-C described above. At 304, the system may encode the captured media content using a selected encoding method. For example, this may be performed by a variable encoder, such as the variable encoders 212A-C of each of the content providing devices 210A-C, as described above.

At 306, the system may transmit the encoded media content streams to a remote production system. In some aspects, this may include transmitting the encoded media content over a remote link as described above with respect to FIG. 2A. In some aspects, this may include transmitting the encoded media content over a communication network as described above with respect to FIGS. 2B and 2C.

At 308, the system may select a media content stream for inclusion in a media production. This may be performed by a video switcher as described above with respect to the remote production system 230. The media content stream may be selected based on receiving a control input from a user identifying the media content stream.

At 310, the system may transmit control signals to content providing devices, which can be tally signals in an exemplary aspect. In particular, the system may transmit a separate control signal to each content providing device transmitting encoded media content to the remote production system. The control signal for a content providing device may identify the selected encoding method for that content providing device and can do so as part of a control system or feedback loop based on instructions received from an operator of the multiviewer, for example. The control signal for the content providing device that is providing the media content stream selected at 308 may identify a high-fidelity encoding method and can be controlled by a tally signal sent to the respective device (e.g., camera), for example. The control signals for other content providing devices may identify a low fidelity encoding method. As described above, at 304, the content providing devices may encode their media content based on the selected encoding method identified by their respective control signals. The control signals are generated to dynamically control and switch which of the respective variable encoders are encoding the media content and at which particular compression rate. As a result, the remote production system 230 can dynamically manage the total bandwidth consumption of media signals being generated by the content providing devices 210A-C, encoded by the variable encoders 212A-C, and then transmitted to the remote production system 230 over link 220, for example and at step 306.

At 312, the system may produce a media production (e.g., a live broadcast production) based on the media content stream selected at 308. This may be performed by a video switcher as described above with respect to the remote production system 230 and as also would be appreciated to one skilled in the art. As the selected media stream changes during the media production, the system is configured to dynamically switch streams are encoded according to which encoding methods as described above.

Figure 4:
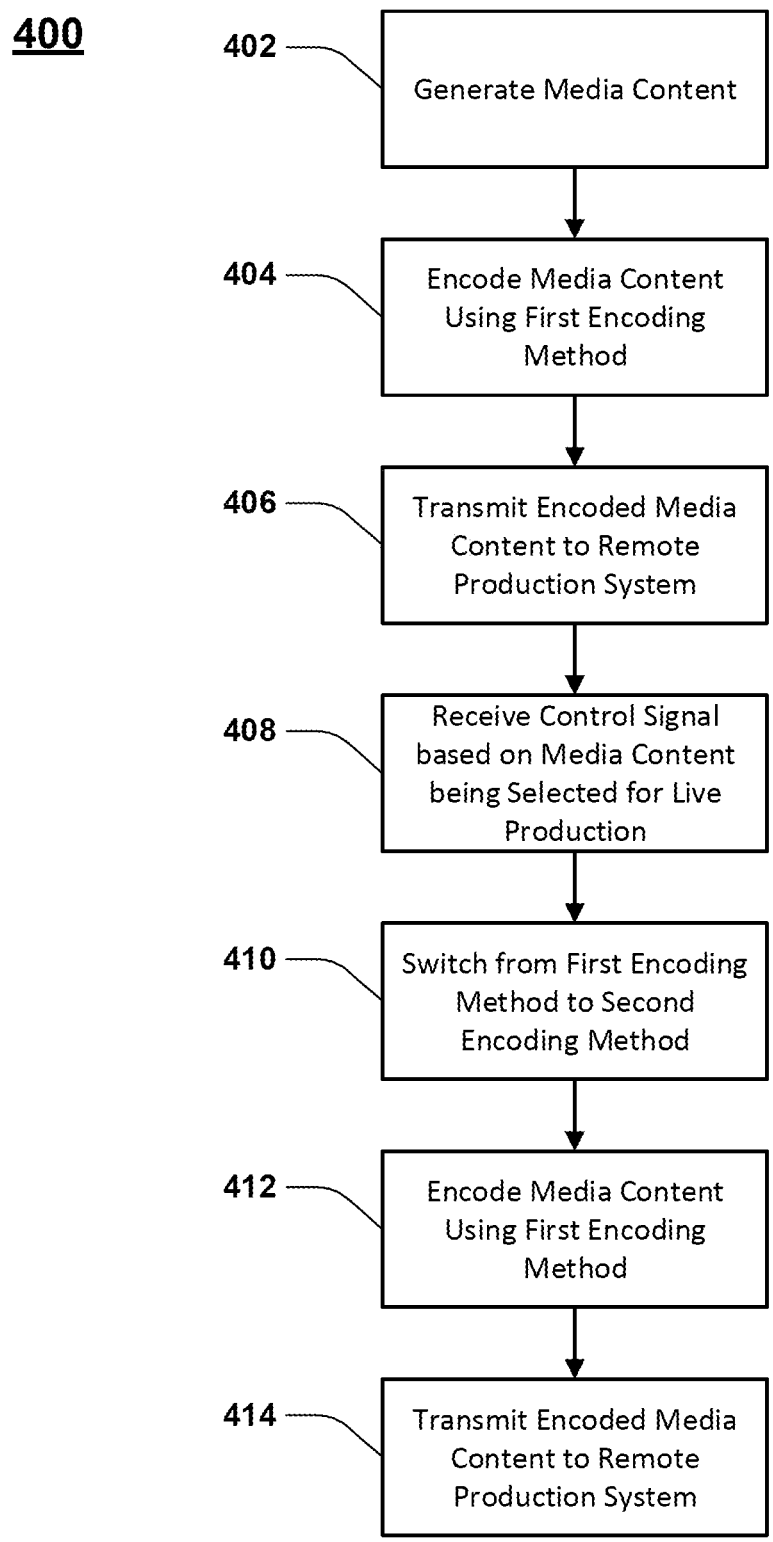
FIG. 4 is a flowchart illustrating a method of generating a media stream for use in producing a media production with reduced bandwidth usage according to an exemplary aspect.

FIG. 4 is a flowchart 400 illustrating a method of providing a media stream for use in producing a media production with reduced bandwidth usage. In general, it should be appreciated that the method may be performed using one or more of the exemplary systems described above with respect to FIGS. 2A, 2B, and 2C. For example, the method may be performed by a content providing device such as the content providing devices 210A-C.

At 402, the content providing device may generate media content. The media content may be a continuous stream of media. For example, this may include a camera capturing a video feed or a capture card capturing a display output.

At 404, the content providing device may encode the media content using a first encoding method. The first encoding method may be a compressed encoding method. In some aspects, the first encoding method may include a set compression bitrate. In some aspects, the first encoding method may include compressing the media content based on the JPEG XS codec. In some aspects, the first encoding method may include compressing the media content based on the JPEG 2000 codec. The first encoding method may include visual lossless compression.

At 406, the content providing device may transmit the encoded media content, encoded based on the first encoding method, to a remote production system. Transmitting the encoded media content to the remote production system may be transmitting the encoded media content over a remote link, as described with respect to FIG. 2A, or transmitting the encoded media content over a communication network, as described with respect to FIG. 2B or FIG. 2C.

At 408, the content providing device may receive a control signal. The control signal may be received based on the media content generated by the content providing device being selected to be included in the media production (e.g., a live broadcast media production). The control signal may be received from the remote production system. The control signal may identify a second encoding method, which may be different from the first encoding method.

At 410, the content providing device may switch from the first encoding method to a second encoding method. Preferably, this switch is performed as a vertically accurate switch between signals. That is, the content providing device may switch from the first encoding method to the second encoding method based on receiving the control signal and at the top of the frame for the media signal. The control signal may identify the second encoding method. The second encoding method may be a high-fidelity encoding method. The content providing device may switch from the first encoding method to the second encoding method in less that the time corresponding to one frame of the media content. In some aspects, the compression bitrate of the first encoding method may be based on a compression bitrate of the second encoding method. In some aspects, the second method may include compressing the media content based on the JPEG XS codec. In some aspects, the second encoding method may include compressing the media content based on the JPEG 2000 codec. The first encoding method may include visual lossless compression.

At 412, the content providing device may encode the captured media content based on the second encoding method. At 414, the content providing device may transmit the encoded media content, encoded based on the second encoding method, to the remote production system.

Figure 5:
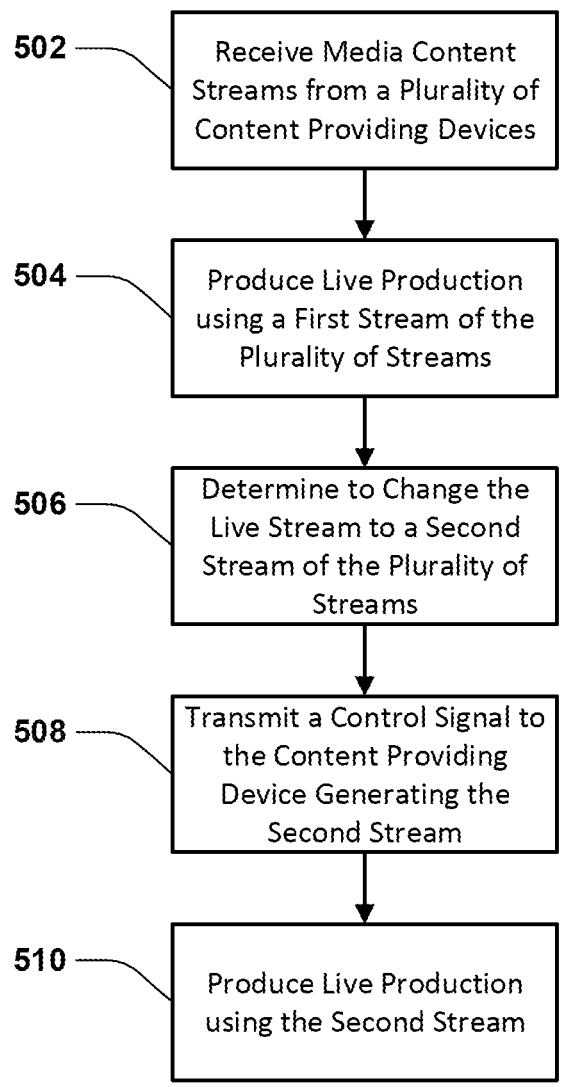
FIG. 5 is a flowchart illustrating a method of producing a media production with reduced bandwidth usage according to an exemplary aspect.

FIG. 5 is a flowchart 500 illustrating a method of producing a media production with reduced bandwidth usage. In general, it should be appreciated that the method may be performed using one or more of the exemplary systems described above with respect to FIGS. 2A, 2B, and 2C, for example, by the remote production system 230.

At 502, the remote production system may receive a plurality of media content streams from a plurality of respective content providing devices.

At 504, the remote production system may produce a media production (e.g., a live broadcast media production) using a first stream of the plurality of media content streams. Producing the production may include generating a continuous stream of media and/or transmitting the continuous stream of data, for example, to a distribution network. Producing the media production using the first stream may include transmitting the first stream (e.g., as the live production) or generating the media production to include the media of the first stream. While producing the media production at 504, the bitrate of the first stream may be higher than the bitrate of a second stream of the plurality of media content streams.

At 506, the remote production system may determine to change a media stream to the second stream of the plurality of streams. Before 506, the first stream may have been the live stream in one exemplary aspect. The remote production system may determine to change the live stream to the second stream based on receiving a control input identifying the second stream (e.g., a tally signal). The control input may be received from a user input device, such as a button, switch, or graphical user interface.

At 508, the remote production system may transmit a control signal to a content providing device of the plurality of content providing devices, the content providing device being the content providing device from which the second stream is received. In some aspects, the control signal may indicate that the second stream is the live stream. In some aspects, the control signal may identify an encoding rate for the content providing device. In some aspects, the second stream may have been received at 502 encoded based on a first encoding method, and the control signal may identify a second encoding method. The second encoding method may have a higher bitrate than the first encoding method.

At 510, after transmitting the control signal to the content providing device, the remote production system may produce the media production using the second stream. While producing the media production at 510, the bitrate of the second stream may be higher than the bitrate of the first stream.

Figure 6:
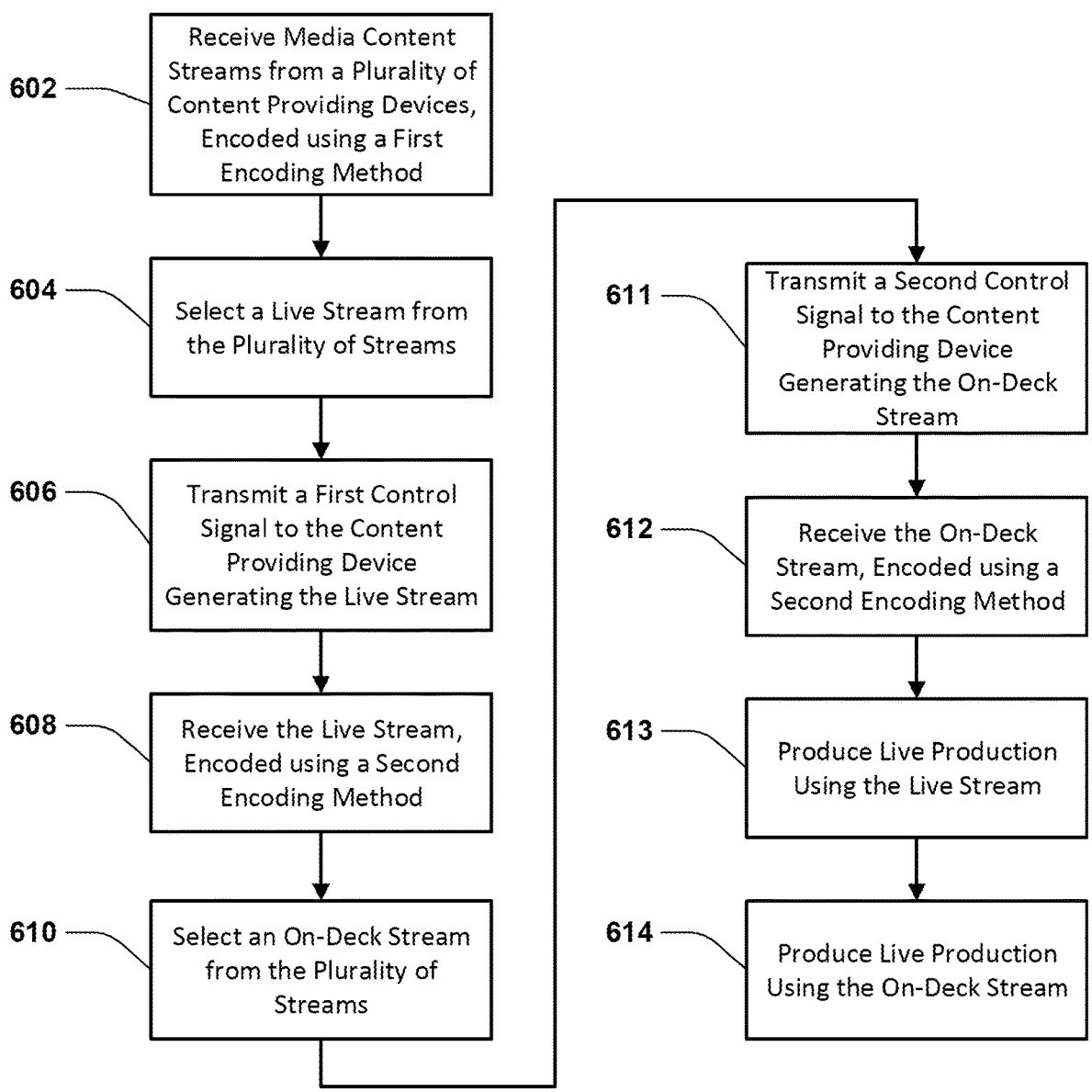
FIG. 6 is a flowchart illustrating a method of producing a media production with reduced bandwidth usage according to an exemplary aspect.

FIG. 6 is a flowchart 600 illustrating a method of producing a media production with reduced bandwidth usage. In general, it should be appreciated that the method may be performed using one or more of the exemplary systems described above with respect to FIGS. 2A, 2B, and 2C, for example, by the remote production system 230.

The descriptions of the systems above focused on one media stream—whichever media stream is currently being broadcasted in the media production (e.g., live broadcast media production)—being encoded using the high-fidelity encoding method. However, in some aspects, multiple media streams may be encoded using the high-fidelity encoding method. For example, in the method of FIG. 6, a live stream and an on-deck stream are both encoded using the high-fidelity encoding method. The live stream may be the media stream currently being broadcasted in the live media production, and the on-deck stream may be the next media stream which will be broadcasted in the live media production. A director of a media production may choose the next stream to include in the live media production before switching, and may identify the next stream as the on-deck stream, such as through an input to a video switcher, prior to switching. Providing an input identifying the next stream to be included in the live media production may, for example, allow a camera operator for a camera generating the next stream to be alerted that his camera will be live soon.

At 602, the remote production system may receive media content streams from a plurality of content providing devices. The media content streams may be encoded based on a first encoding method. The first encoding method may be a compressed encoding method, and receiving the plurality of media content streams encoded based on the first encoding method may limit the bandwidth used for transmitting the plurality of media streams to the remote production system.

At 604, the remote production system selects a live stream from the plurality of streams. For example, the remote production system may select the live stream based on control inputs from a user, such as a director, indicating that the live stream should currently be included in the live media production.

At 606, the remote production system may transmit a first control signal to the content providing device generating the media stream selected as the live stream. The first control signal (e.g., a red tally signal or separate control signal) may instruct the content providing device to switch to encoding the media stream selected as the live stream based on a second encoding method. The second encoding method may be different than the first encoding method. For example, the second encoding method may have a higher bitrate than the first encoding method. At 608, the remote production system receives the live stream, encoded using the second encoding method.

At 610, the remote production system may select an on-deck stream from the plurality of streams. For example, the remote production system may select the on-deck stream based on control inputs from a user, such as a director, indicating that the on-deck stream may be the next media stream to be included in the live media production.

At 612, the remote production system may transmit a second control signal to the content providing device providing the media stream selected as the on-deck stream, for example, as a yellow tally signal. The second control signal may instruct the content providing device to switch to encoding the media stream selected as the on-deck stream based on the second encoding method. At 614, the remote production system receives the on-deck stream, encoded using the second encoding method.

At 613, the remote production system may produce the live production using the live stream. As the live stream is encoded based on the second encoding method, not the first method, when decoded at the remote processing system it may have experienced little or no loss in quality from the encoding and decoding and may be suitable for inclusion in the live production.

At 614, the remote production system may produce the live production using the on-deck stream. For example, the remote production system may produce the live production using the on-deck stream in response to receiving a user input indicating that the on-deck stream should currently be included in the live media production. As the on-deck stream is encoded based on the second encoding method, not the first method, when decoded at the remote processing system it may have experienced little or no loss in quality from the encoding and decoding and may be suitable for inclusion in the live production. Further, as the on-deck stream received was already being encoded based on the second encoding method, the remote production system may include it in the live media production immediately. In some aspects, at 614, the remote processing unit may also transmit a third control signal to the content generation device generating the live stream, instructing the content generation device generating the live stream to switch to encoding the media stream based on the first encoding method.

Figure 7:
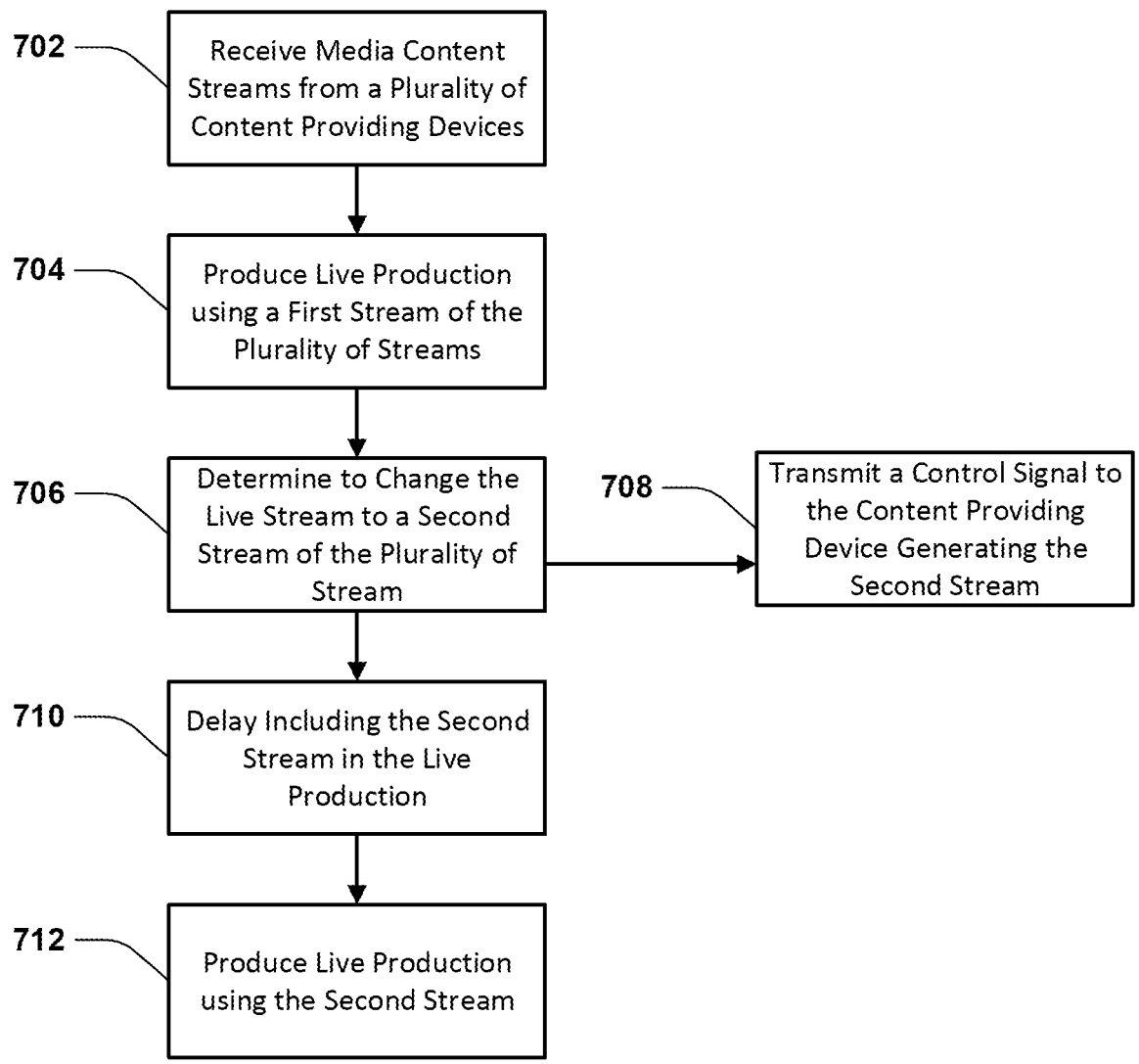
FIG. 7 is a flowchart illustrating a method of producing a media production with reduced bandwidth usage according to an exemplary aspect.

FIG. 7 is a flowchart 700 illustrating a method of producing a live media production with reduced bandwidth usage. In general, it should be appreciated that the method may be performed using one or more of the exemplary systems described above with respect to FIGS. 2A, 2B, and 2C, for example, by the remote production system 230.

At 702, the remote production system may receive media content streams from a plurality of content providing devices. At 704, the remote production system may produce a live production using a first stream of the plurality of streams (e.g., by including the first stream in the live production). The first stream, when received by the remote production system, may be encoded based on a high-fidelity encoding method, and the other media streams of the plurality of media streams may be encoded based on a compressed encoding method.

At 706, the remote production system may determine to change the live stream—the stream included in the live production—from the first stream to a second stream of the plurality of streams. In response to determining to change the live stream to the second stream, the remote production system may, at 708, transmit a control signal to the content providing device generating the second stream and, at 710, delay including the second stream in the live production. The control signal may instruct the content providing device generating the second stream to switch to encoding the second stream based on the high-fidelity encoding method. The control path for the control signal may have a latency, or the content providing device may have an encoding switching latency, so while the remote production system may have transmitted the control signal to switch the second stream to be encoded using the high-fidelity encoding method, the second stream received at the remote production system may still be encoded based on the compressed encoding method. The delay at 710 may provide time for the encoding of the second stream to switch to the high-fidelity encoding method prior to the second stream being included in the live production. In some aspects, the delay may be a fixed number of frames. In some aspects, the delay may be a single frame.

At 712, after the delay at 710, the remote production system may produce the live production including the second stream. As the delay provided adequate time for the control signal to reach the content providing device and for the content providing device to switch encoding methods, the second stream included in the live production may not have experienced loss due to compression.

Figure 8:
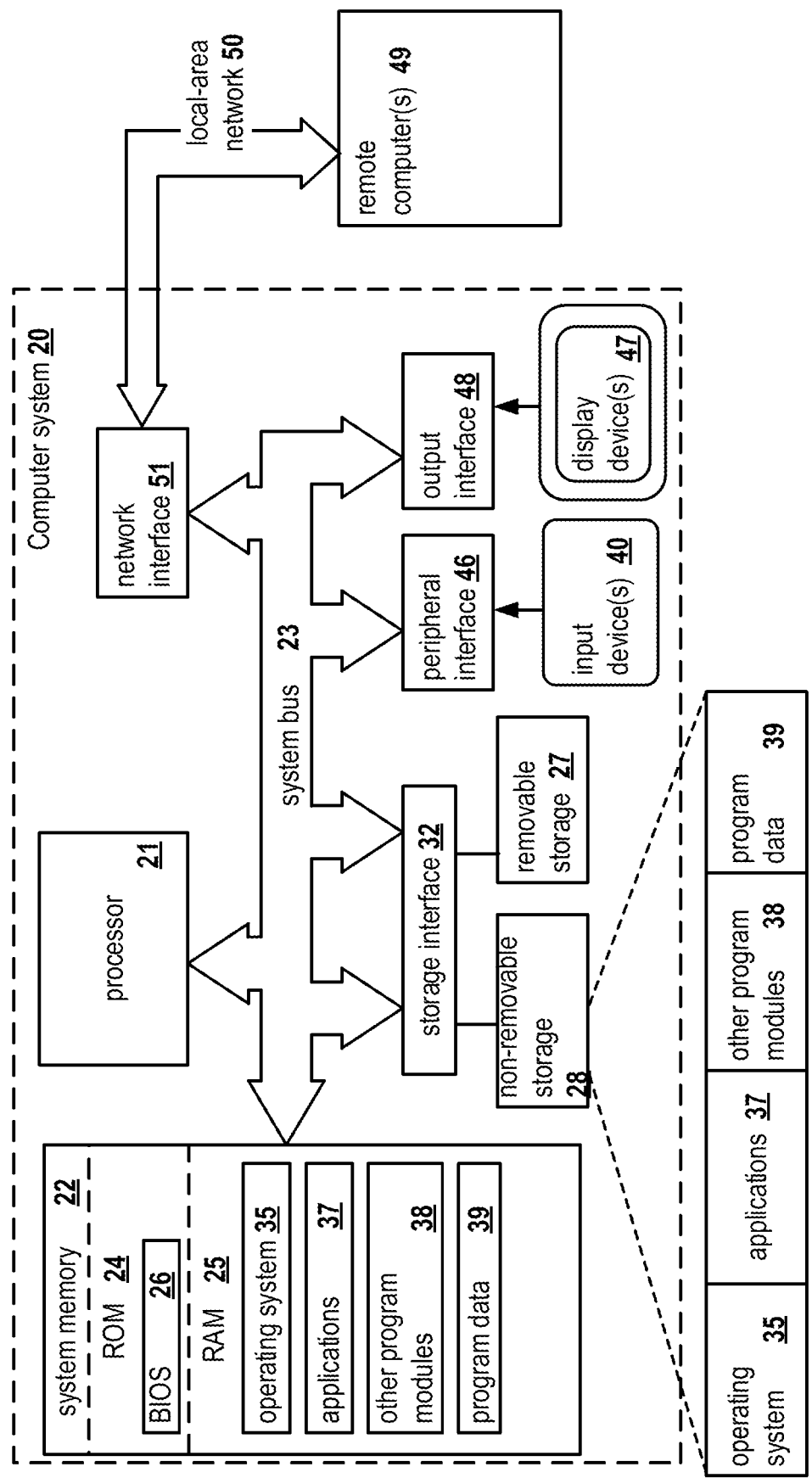
FIG. 8 is a block diagram illustrating a computer system on which aspects of systems and methods for generating a media stream for use in producing a media production with reduced bandwidth usage according to an exemplary aspect.

FIG. 8 is a block diagram illustrating a computer system on which aspects of systems and methods for generating a media stream for use in producing a live media production with reduced bandwidth usage according to an exemplary aspect. In general, it is noted that the computer system 20 can correspond to any computing system configured to execute the systems and methods described above, including the content providing devices 110A-110C and remote production system 130, for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to scene script database 225, for example.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices as described above with respect to FIGS. 1 and 2A-2C as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

It should be appreciated that the above-noted components may be implemented using a combination of both hardware and software. Accordingly, in one or more example aspects, the functions described may be implemented in hardware, software, firmware, or any combination thereof.

Moreover, while aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems and so on. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. All structural and functional equivalents to the elements of the various aspects described throughout this disclosure that are known or later come to be known to those of ordinary skill in the art are expressly incorporated herein by reference and are intended to be encompassed by the claims.

What is claimed:

1. A system for dynamic bitrate switching of media streams in a media video production, the system comprising:

a plurality of content providing devices that each have a variable encoder configured to encode a media stream at a media production quality and at a non-media production quality that is lower than the media production quality; and a production system located remotely from the plurality of content providing devices in a cloud-computing environment and configured to transmit respective control signals to at least one content providing device of the plurality of content providing devices to control an encoding process by the variable encoder of the at least one content providing device, wherein the respective control signals sent to the at least one content providing device configure the at least one content providing device to encode the respective media stream at a visually lossless compression, wherein the production system includes a control system for transmitting the respective control signals to each variable encoder of the plurality of content providing devices to dynamically adjust respective bitrates of each media stream transmitted by the plurality of content providing devices to maintain a total bandwidth consumption of a data transmission link between the plurality of content providing devices and the production system below a predefined bandwidth consumption threshold, wherein the control system is further configured to reset each variable encoder of the plurality of content providing devices at a top of each frame of each media stream to dynamically adjust the respective bitrates of each media stream instantaneously, wherein the at least one content providing device is a media production camera and the respective control signal sent to the at least one content providing device is a tally signal indicating the media stream of the at least one content providing device is currently being distributed in a live media production by the production system, such that the variable encoder of the at least one content providing device encodes the media stream in the media production quality, wherein the production system is configured to generate the live media production based on the media stream received from the at least one content providing device.

2. The system according to claim 1, wherein the plurality of content providing devices are located at a venue for providing each media stream of live video content for a live media production.

3. The system according to claim 1, wherein each variable encoder of the plurality of content providing devices are configured to encode the respective media stream at a plurality of compression rates including compression rates for the media production quality and the non-media production quality.

4. The system according to claim 1, wherein the data transmission link has a total predefined bandwidth with the variable encoders each being configured to dynamically adjust the compression of each of the media streams to ensure that a total consumed bandwidth by the media streams is at or below the predefined bandwidth consumption threshold.

5. A system for dynamic bitrate switching of media streams in a media video production, the system comprising:
a plurality of content providing devices that each have a variable encoder configured to encode a media stream at a media production quality and at a non-media production quality that is lower than the media production quality; and a production system located remotely from the plurality of content providing devices on a cloud computing environment and configured to transmit respective control signals to at least one content providing device of the plurality of content providing devices to control an encoding process by the variable encoder of the at least one content providing device, wherein the respective control signals sent to the at least one content providing device configure the at least one content providing device to encode the respective media stream at a visually lossless compression, wherein the production system includes a control system for transmitting the respective control signals to each variable encoder of the plurality of content providing devices to dynamically adjust respective bitrates of each media stream transmitted by the plurality of content providing devices to maintain a total bandwidth consumption of a data transmission link between the plurality of content providing devices and the production system below a predefined bandwidth consumption threshold, wherein the control system is further configured to reset each variable encoder of the plurality of content providing devices at a top of each frame of each media stream to dynamically adjust the respective bitrates of each media stream instantaneously.

6. The system according to claim 5, wherein the at least one content providing device is a media production camera and the respective control signal sent to the at least one content providing device is a tally signal indicating the media stream of the at least one content providing device is currently being distributed in a live media production by the production system, such that the variable encoder of the at least one content providing device encodes the media stream in the media production quality.

7. The system according to claim 6, wherein the production system is configured to generate the live media production based on the media stream received from the at least one content providing device.

8. The system according to claim 5, wherein the plurality of content providing devices are located at a venue for providing each media stream of live video content for a live media production.

9. The system according to claim 5, wherein each variable encoder of the plurality of content providing devices are configured to encode the respective media stream at a plurality of compression rates including compression rates for the media production quality and the non-media production quality.

10. The system according to claim 5, wherein the production system is further configured as a virtual router panel and production system in a cloud-computing environment.

11. The system according to claim 5, wherein the data transmission link has a total predefined bandwidth with the variable encoders each being configured to dynamically adjust the compression of each of the media streams to ensure that a total consumed bandwidth by the media streams is at or below the predefined bandwidth consumption threshold.

12. A system for dynamic bitrate switching of media streams in a media video production, the system comprising:
at least one content providing device having a variable encoder configured to encode a media stream at a media production quality and at a non-media production quality that is lower than the media production quality; and a production system located remotely from the at least one content providing device on a cloud computing environment and configured to transmit a control signal to the at least one content providing device to control an encoding process by the variable encoder, wherein the control signal sent to the at least one content providing device configures the at least one content providing device to encode the respective media stream at a visually lossless compression, wherein the production system includes a control system for transmitting the control signal to each variable encoder of the at least one content providing devices to dynamically adjust a bitrate of the media stream transmitted by the at least one content providing device to maintain a total bandwidth consumption of a data transmission link between the at least one content providing device and the production system below a predefined bandwidth consumption threshold, wherein the control system is further configured to reset each variable encoder of the at least one content providing devices at a top of each frame of each media stream to dynamically adjust the respective bitrates of each media stream instantaneously.

13. The system according to claim 12, wherein the at least one content providing device is a media production camera and the respective control signal sent to the at least one content providing device is a tally signal indicating the media stream of the at least one content providing device is currently being distributed in a live media production by the production system, such that the variable encoder of the at least one content providing device encodes the media stream in the media production quality.

14. The system according to claim 13, wherein the production system is configured to generate the live media production based on the media stream received from the at least one content providing device.

15. The system according to claim 12, wherein the variable encoder of the at least one content providing device is configured to encode the media stream at a plurality of compression rates including compression rates for the media production quality and the non-media production quality.

16. The system according to claim 12, wherein the production system is further configured as a virtual router panel and production system in a cloud-computing environment.

17. The system according to claim 12, wherein the data transmission link has a total predefined bandwidth with the variable encoders each being configured to dynamically adjust the compression of each of the media streams to ensure that a total consumed bandwidth by the media streams is at or below the predefined bandwidth consumption threshold.

* * * * *